United States Patent
Schwuger et al.

(10) Patent No.: US 6,186,301 B1
(45) Date of Patent: Feb. 13, 2001

(54) SYNCHRONIZING DEVICE FOR A MANUAL TRANSMISSION, IN PARTICULAR SYNCHRONIZER ELEMENT WITH INTEGRATED THRUST MEMBER OR LOCKING MEMBER FOR USE IN A SUCH SYNCHRONIZING DEVICE

(75) Inventors: Josef Schwuger, Höchstadt; Reinhart Malik, Herzogenaurach; Reiner Martin, Pommersfelden, all of (DE)

(73) Assignee: INA Wälzlager Schaeffler oHG, Herzogenaurach (DE)

( * ) Notice: Under 35 U.S.C. 154(b), the term of this patent shall be extended for 0 days.

(21) Appl. No.: 09/354,364

(22) Filed: Jul. 14, 1999

(30) Foreign Application Priority Data

Jul. 21, 1998 (DE) .............................. 198 32 729

(51) Int. Cl.⁷ ..................................... F16D 23/06
(52) U.S. Cl. .................... 192/53.32; 192/53.34; 192/53.341
(58) Field of Search ............... 192/53.32, 53.34, 192/53.341, 53.342, 53.361, 53.4

(56) References Cited

U.S. PATENT DOCUMENTS 4,132,298   1/1979   F'Geppert .

5,887,688 * 3/1999  Ploetz et al. ................. 192/53.341

FOREIGN PATENT DOCUMENTS

| 25 37 495 | 3/1976 | (DE) . |
| 27 06 661 A1 | 8/1978 | (DE) . |
| 94 08 943 U 1 | 9/1994 | (DE) . |
| 195 80 558 | 11/1998 | (DE) . |

OTHER PUBLICATIONS

"Anwendungsbeispiele, Produkte für die Schaltung im KFZ–Getrieben", publication by INA Waelzlager Schaeffler oHG, Aug. 1993.

"Zahnradgetriebe" by Johannes Loomann, 1996, pp. 452 ff.

* cited by examiner

Primary Examiner—Richard M. Lorence
(74) Attorney, Agent, or Firm—Henry M. Feiereisen

(57) ABSTRACT

A synchronizer element for use in a synchronizing device of a manual transmission, includes a hub secured in fixed rotative engagement on a gearshaft, and a guide member fixedly secured to the hub and having a splined outer circumference formed with at least one pocket for receiving a loading member and in mesh with a shift sleeve moveable between axially spaced pinion gears rotatably supported on the shaft. The synchronizer element is made of two separate parts which are so joined together as to form pockets for thrust members which are held captive and guided in the pockets.

6 Claims, 3 Drawing Sheets

SYNCHRONIZING DEVICE FOR A MANUAL TRANSMISSION, IN PARTICULAR SYNCHRONIZER ELEMENT WITH INTEGRATED THRUST MEMBER OR LOCKING MEMBER FOR USE IN A SUCH A SYNCHRONIZING DEVICE

CROSS-REFERENCES TO RELATED APPLICATIONS

This application claims the priority of German Patent Application, Serial No. 198 32 729.3, filed Jul. 21, 1998, the subject matter of which is incorporated herein by reference.

BACKGROUND OF THE INVENTION

The present invention relates, in general, to a synchronizing device for a manual transmission, and, more particularly, to a synchronizer element with integrated thrust member or locking member for use in such a synchronizing device.

Current manual transmissions include synchronizing devices to attain a comfortable shift between individual gear ratios. During gearshift, the synchronizing device matches the circumferential speed of a pinion gear to the circumferential speed of the gearshaft and subsequently effects a positive connection between the gearshaft and the pinion gear. Various designs of synchronizing devices are described in the German Technical Book, entitled "Zahnradgetriebe" by Johannes Loomann, 1996, pages 452 ff.

The synchronizer element, which constitutes an important component of a synchronizing device, connects the gearshaft in fixed rotative engagement with a shift sleeve which is axially moveable between the pinion gears for change of the gear ratio. Typically, the fixed rotative engagement is realized by providing the synchronizer element with a hub which has a splined or toothed circumference in mesh with the gearshaft, and a guide member which has external teeth so in mesh with the inwardly splined shift sleeve that the shift sleeve can move in direction of the longitudinal center axis of the gearshaft. In addition, depending on the design, the synchronizer element may also serve as stop and guide element for synchronizer rings and friction rings, with the synchronizer element having end faces formed with oblong throughbores or recesses for guiding bolts or cams of the synchronizer rings or friction rings. The synchronizer element is further provided with pockets which are evenly spaced about the outer circumference and receive locking members such as locking bolts and ball-shaped locking elements, and thrust members. The locking members hold the shift sleeve in the center position when the synchronizing device is in neutral and no gear ratio is operative so that the pinion gears rotate freely on the gearshaft. In this position, the locking elements are biased by a spring for a press fit in a groove of the shift sleeve, or the locking element acts on a thrust member which is received in a lock-in groove of the shift sleeve. The end faces of the synchronizer element oftentimes serve directly or via an intermediate element, e.g. a disk, as cam surface for the neighboring pinion gears.

In manual transmissions, it is common to position the synchronizing device on the gearshaft between two pinion gears so that the synchronizing device can selectively positively connect the one or the other one of the pinion gears, disposed to the left and to the right of the synchronizing device, with the gearshaft. The synchronizing element is of such design that the attached shift sleeve can move to the left or to the right in axial direction and that, for example in a double cone synchronization, the cams of the inner synchronizer ring are guided in form-fitting manner. Normally, the left and the right pinion gears have identical connecting elements so that the synchronizer element has a symmetric configuration.

However, on occasions, slight structural variations exist between the left and right pinion gears, e.g. when combining forward and reverse gears, so that the left and right portions of the synchronizer element exhibit structural variations.

In synchronizing devices of this type, the thrust members received in the pockets of the synchronizing element effect during gearshifting a pre-synchronization, i.e. a movement of the respective synchronizer ring against a friction area of the neighboring clutch member or intermediate ring, for example in a double cone synchronization of the synchronizing device. Depending on the design of the synchronizing device, the thrust member is biased either directly by one or two springs, or by a pre-loaded locking bolt or spherical locking member in a lock-in groove of the shift sleeve. When axially moving the shift sleeve for selection of a gear, the inner contour of its lock-in groove pushes one end of the thrust member against the synchronizer ring so that the synchronizer ring is pressed against the friction area.

The configuration and profile of the teeth, recesses and/or longitudinal grooves of a synchronizing element are dependent on the shape and operation of its connecting elements. For example, the recesses on the end faces of the synchronizer element may be configured as bores or oblong holes which may extend through or formed as blind holes. The circumferentially spaced pockets for the locking members and thrust members may also be configured as blind holes or longitudinal grooves of different design. As a result of the stated demands with respect to design and construction, the synchronizer elements for synchronizing devices are normally very complex and complicated components.

German Pat. No. DE 195 80 558 describes a synchronizer element having internal teeth for engagement in a gearshaft, and external teeth about its outer circumference for supporting a shift sleeve. Guided in the synchronizer element is a thrust member as a structural unit. The thrust member is formed by a sleeve-shaped housing with bottom for mounting therein of a ball-shaped locking member and a compression spring. Provided on the housing of the thrust member are guide tabs for guiding the structural unit in a T-shaped longitudinal groove of the synchronizer element. Manufacture of such a synchronizer element, in particular on a large scale, is very difficult and expensive because the synchronizer element is made through a material-removal process or material-removing finishing work from blanks. Therefore, manufacture of such synchronizer elements frequently compromises between a functionally necessary diversity of the shape and manufacturing costs so that an optimum operation can oftentimes not be realized.

Normally, synchronizer elements are of very compact and enclosed structure. As a consequence, they have a relatively high weight and require significant use of material. In addition, they are very rigid and enclosed. This adversely affects material consumption during production of the synchronizer element, overall weight of the gearbox, transfer of oscillations and impacts, and oil circulation in the synchronizing device.

Assembly of the synchronizing device requires a loose and individual placement of the thrust members, locking bolts, compression springs or the structural unit, into the synchronizer element, whereby these components are normally spaced about the circumference. The assembly of the synchronizer element is thus cumbersome and time-consuming. Moreover, quality problems may arise when, for example, some components have been overlooked and thus forgotten to be installed.

SUMMARY OF THE INVENTION

It is thus an object of the present invention to provide an improved synchronizer element, obviating the afore-stated drawbacks.

In particular, it is an object of the present invention to provide an improved synchronizer element which is easy to produce on a large scale in almost any shape while yet avoiding the drawbacks associated with synchronizer elements made through material removal process and with installation of locking members and also thrust members.

These objects, and others which will become apparent hereinafter, are attained in accordance with the present invention by providing a synchronizer element in the form of two parts which are made separately and joined subsequently in the area of the transverse center plane or partition plane of the synchronizer element, with pockets being formed between the parts for receiving locking members and/or thrust members, whereby the parts may have a symmetric or nearly symmetric configuration or may be different from one another.

Suitably, the parts are made individually through a non-cutting process and subsequently joined together, for example, by welding or riveting. Another example for joining the parts may include bolting. A synchronizer element made in accordance with the present invention has the advantage that the parts may be configured differently, for example, with varying recesses on their end faces, so that the complicated incorporation of the pockets in the outer circumference of the synchronizing element is eliminated as the inner contour forming the pockets is already provided in one or preferably both parts during manufacture thereof. This contour suitably forms, preferably, a symmetry half of the pocket which is open toward the transverse center plane bounding the pocket and, at the same time, defining the plane of symmetry of the pocket. When joining the parts, the symmetry halves are precisely positioned with respect to one another so as to form between the parts a pocket in the shape of a blind hole.

According to another feature of the present invention, at least one part, preferably both parts, of the synchronizer element are made through a non-cutting forming process, whereby a blank of sheet metal or band material is used which is separated and its shape changed through forming to a desired configuration. Thickness and weight of the blank is selected according to functional needs and the required strength of the finished article. Recesses and grooves can be formed in any desired configuration, for example through punching and embossing of the flat blank.

Synchronizer elements made through a non-cutting process are not subject to any restrictions as far as their three-dimensional geometric configuration is concerned when composed of individual parts which are joined together and profiled accordingly. For example, the parts may be formed to provide the symmetry halves of the pockets and the cam surface for the pinion gear to be connected to the synchronizer element. A major portion of the starting material for making the synchronizer element is indeed used for formation of the geometric configuration of the synchronizer element and is not lost through complicated cutting processes. Thus, a synchronizer element made in accordance with the present invention through a non-cutting process does not contain superfluous material but has only so much material as is necessary for the function and strength of the synchronizer element. Losses as a result of residual material during non-cutting process for manufacturing the synchronizer element are minimal, so that the material consumption and thus the material costs are low. As no excess material remains on the finished article, the overall weight of the synchronizer element is very small, and a synchronizer element according to the invention displays high elasticity and attenuation properties with respect to vibrations and shocks. Thus, the use of a synchronizer element according to the present invention contributes also to a lowering of the overall weight of the motor vehicle and enhances the shifting comfort.

Modern non-cutting shaping processes achieve a high precision of manufactured parts so that cutting finishing works are kept to a minimum or are completely eliminated. Synchronizer elements made through a non-cutting process have also the additional advantage of short production cycles as a result of eliminating cutting finishing processes.

According to another feature of the present invention, the structural unit comprised, e.g., of a spherical locking element and a spring received in a housing, is held captive and guided in the pocket formed between the portions of the synchronizer element. Thus, the synchronizer element forms an assembly unit, thereby attaining an easy and cost-efficient installation of the synchronizing device. It is also possible, to hold locking members such as spherical locking elements or locking bolt, with or without spring element, captive in the pockets, or to hold thrust members captive in the pockets. Such an assembly unit renders the installation of the synchronizing device less time consuming and more cost-efficient, as a time-intensive installation of individual thrust members and locking members is eliminated.

According to another feature of the present invention, the thrust member is held captive in the pocket and has ends pointing in opposite directions and guided in adjacent bores of the pocket for free movement along the longitudinal axis, with the ends of the thrust member jutting out beyond an outer contour of the pocket. The bores are formed in the wall of the pocket, with the thrust member being axially aligned in the bores, i.e. along the longitudinal center axis of the synchronizer element. Suitably, the thrust member may be captivated, for example, by a helical spring which so extends between the bottom of the pocket of the synchronizer element and the thrust member as to bias the thrust member radially outwards. The ends of the thrust member are thereby forced by the action of the spring against the upper edge of the bores. Thus, the thrust member can be removed from the synchronizer element only in opposition to the force applied by the spring, and is secured against loss during transport and handling. The spring force realizes at the same time in the fully assembled synchronizing device that the thrust element is locked in the lock-in groove of the shift sleeve and secured in place. It is also possible to secure the circumferentially spaced thrust member by annular springs which simultaneously act on and bias the thrust members against the upper edge of the bores, instead of biasing each thrust member by a separate spring. In both cases, the thrust members are secured in place for transport and handling during installation. If no spring should be used, the thrust member can be so configured as to be held captive in the synchronizer element, for example, by providing the thrust member with a greater cross section than the free cross section of the bore in which the ends of the thrust member are guided. Before joining the parts to form the synchronizer element, the thrust member is placed between the parts and held captive in the pocket once the parts have been joined together as the greater cross section of the thrust member is unable to slip past the bores.

Instead of a thrust member, it is also possible to hold a structural unit captive in the pocket of the synchronizer element, with the structural unit serving as locking member and thrust member and including, for example, a housing accommodating a spherical locking element or locking bolt and a compression spring which biases the locking element or bolt. The housing of this structural unit has tabs pointing in opposite direction and guided in adjacent bores of the pocket for free movement along the longitudinal axis, with the tabs of the housing jutting out beyond an outer contour of the pocket. The tabs operate like the ends of the thrust member and are pushed against the synchronizer ring during pre-synchronization. The pocket has sufficient space in axial direction to enable the thrust member to move axially for synchronization. Conceivably, in the space between wall and housing, resilient or attenuating elements may be accommodated, to dampen shocks or vibrations e.g. during gearshift, or to deliberately influence the shifting forces. The axial force applied by the shift sleeve is divided into two components in the spherical locking element. One component effects an axial displacement of the housing with one tab against the synchronizer ring, while the other component permits the spherical locking element to spring back when being pressed out of the lock-in groove. As described above with respect to the thrust members, the structural unit is placed, before the parts of the synchronizer element are joined together, between the parts into the pocket and the tabs are positioned in the bores. Subsequently, the symmetric parts of the synchronizer element are joined together. The position of the tabs and the position of the bores can be suited to a certain extent to the configuration, in particular diameter, of the synchronizer ring. If, for example, it becomes necessary to install a synchronizer ring with smaller or greater diameter, the position of the tabs on the housing and the position of the bore in the parts of the synchronizer can be adjusted in radial direction to the modified diameter of the synchronizer ring. Thus, any required tool changes are limited to the position of the tabs and the bores. The thereby attained cost savings are significant as a result of the limited diversity of parts and the reduced tool costs. In addition, the configuration of the synchronizer rings is simplified compared to conventional synchronizer rings because, heretofore, conventionally synchronizer rings were oftentimes provided with stops for the thrust members to compensate for the diametrical variations.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
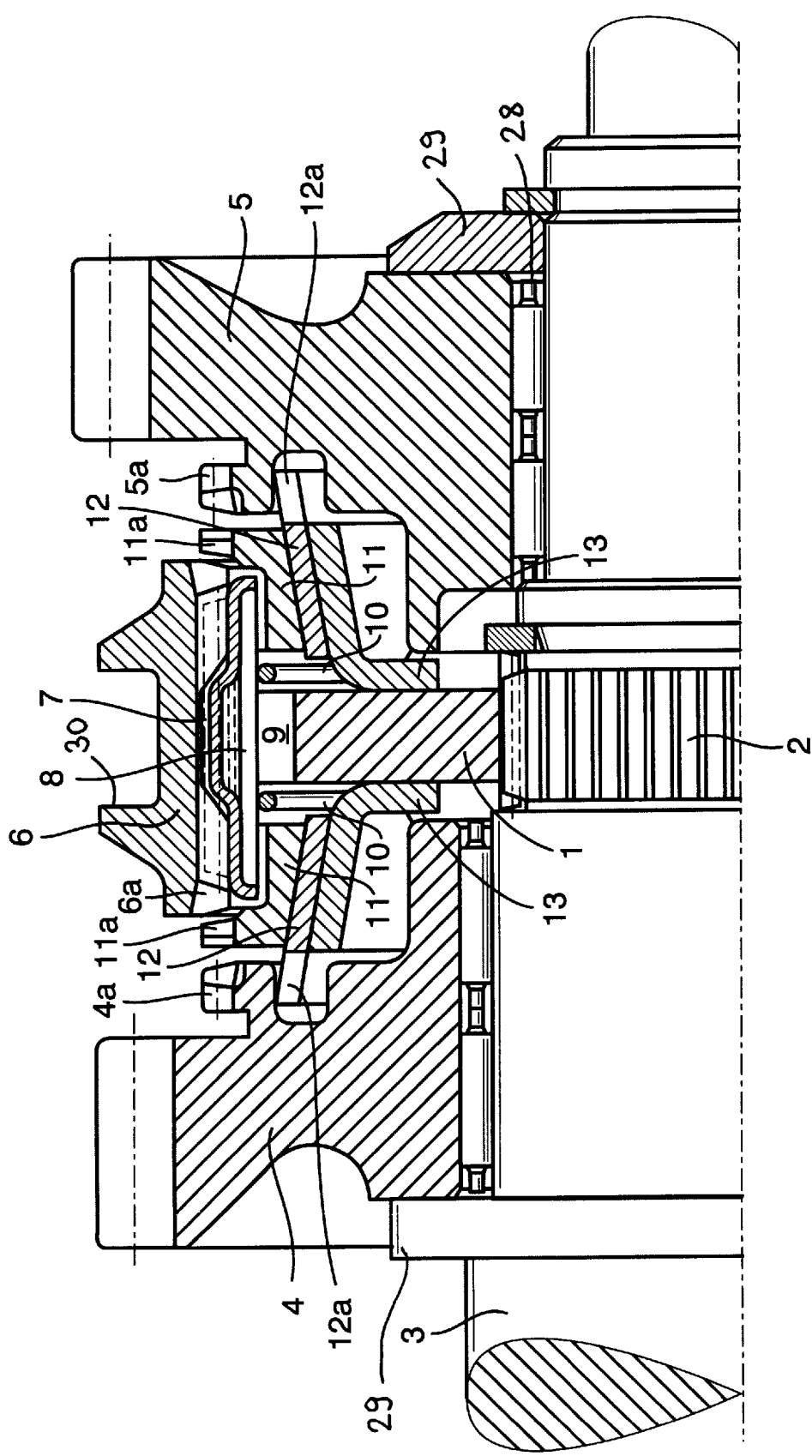
FIG. 1 is a partial longitudinal section of one half of a conventional double cone synchronizing device for manual transmissions.

Throughout all the Figures, same or corresponding elements are generally indicated by same reference numerals.

Turning now to the drawing, and in particular to FIG. 1, there is shown a partial longitudinal section of a conventional synchronizing device in the form of a double cone synchronizing device, as described in a publication by INA Waelzlager Schaeffler oHG, and entitled "Anwendungsbeispiele, Produkte fü die Schaltung in KFZ-Getrieben", published August 1993 in order to describe the general operation and structure of a synchronizing device for use in a manual transmission. The transmission includes a gearshaft 3 and two selectively driven pinion gears 4, 5 which are freely rotatably mounted via needle bearings 28 on the gearshaft 3 and held captive by axially spaced collars 29 to prevent an axial displacement of the pinion gears 4, 5.

The synchronizing device for selectively coupling the gearshaft 3 to the pinion gears 4, 5 so as to shift the transmission into different speed ratios includes a synchronizer element 1 which has internal teeth 2 for fixed rotative engagement on the gearshaft 3. The synchronizer element 1 has an outer circumference for supporting an annular shift sleeve 6 which can move in axial direction without executing a rotational movement through engagement of a suitable component, such as a yoke (not shown), in a groove 30 formed on the shift sleeve 6 at the side distant to the synchronizer element 1. At three or more locations (only one location is shown in FIG. 1) around its periphery, the synchronizer element 1 is formed with a radial bore 9 for receiving a thrust member 8 which engages a confronting lock-in groove 7 of the shift sleeve 6. Two annular springs 10 commonly load the thrust members 8 in the direction of the outer diameter of the synchronizer element 1 against the associated lock-in groove 7 of the shift sleeve 6.

FIG. 1 shows a neutral center position of the shift sleeve 6 so that neither of the two pinion gears 4, 5 is connected so that the pinion gears 4, 5 rotate freely on the gearshaft 3. Through axial displacement of the shift sleeve 6, one or the other pinion gear 4, 5 can be connected to the gearshaft 3 via the synchronizer element 1 to realize the selected gear ratio.

In order to gradually decrease the speed of the connected pinion gear 4 or 5 to match the speed of the gearshaft 3, the synchronizing device further includes an outer synchronizer ring 11, an inner synchronizer ring 13 and an intermediary ring 12 positioned between the inner and outer synchronizer rings 13, 11. During gearshifting, the axial movement of the shift sleeve 6 results in a displacement of the thrust member 8 against the outer synchronizer ring 11 to realize a pre-synchronization. The outer synchronizer ring 11 acts with its friction surface upon the intermediary ring 12 which has lobes 12a positively engaging the pinion gear 4, 5. The action by the friction surface causes a deceleration of the speed of the pinion gear 4, 5 and is supported by a further friction action of the inner synchronizer ring 11 which positively engages the synchronizer element 1.

The outer synchronizer ring 11 is externally splined at 11a to prevent the internal teeth 6a of the shift sleeve 6 from prematurely, i.e. before pre-synchronization, reaching the teeth 4a, 5a on the pinion gear 4, 5. This locking action is released only after the pinion gear 4, 5 matches the speed of the gearshaft 3. When synchronization is attained between the gearshaft 3 and the pinion gear 4, 5, the internal teeth 6a are pushed by the teeth 11a into the teeth 4a, 5a of the pinion gear 4, 5. Thus, the gearshaft 3 is in fixed rotative engagement with the pinion gear 4, 5.

Figure 2:
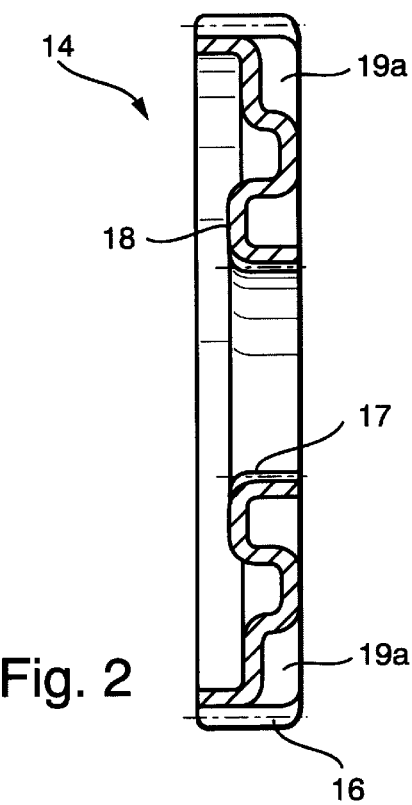
FIG. 2 is a partial longitudinal section of a symmetrically shaped portion that forms part of a synchronizer element for use in a synchronizing device.
Figure 3:
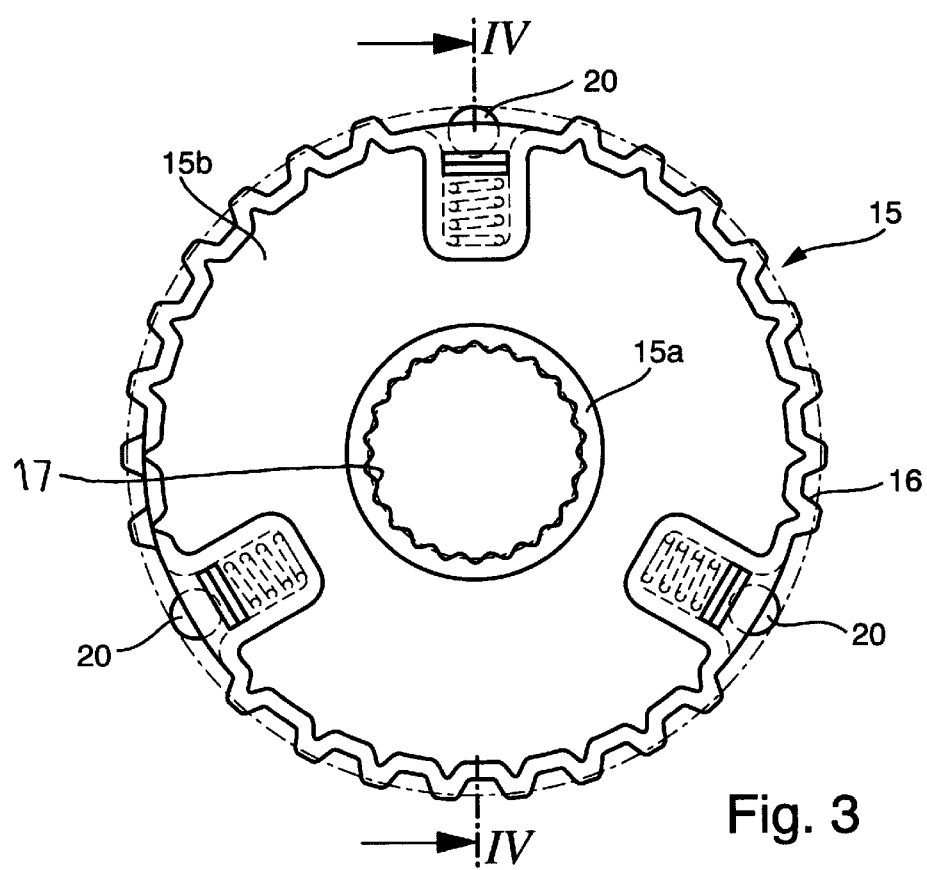
FIG. 3 is a top view of a synchronizer element according to the present invention as assembly unit for use in a synchronizing device, with a plurality of structural units comprised of thrust members and locking members being received about its circumference.

Turning now to FIG. 3, there is shown a top view of a synchronizer element according to the present invention, generally designated by reference numeral 15 and made through a non-cutting forming process by joining two parts of sheet metal to one another. On such part is shown in FIG. 2 and generally designated by reference numeral 14. The part 14 is of symmetric configuration and shaped with outer teeth 14, inner teeth 17, a cam surface 18 for a pinion gear and a generally S-shaped area forming a symmetry half 19a for a pocket 19 of the synchronizer element 15. After being individually formed, the two symmetric parts 14 are joined together at the partition plane, e.g. by welding or riveting.

Figure 4:
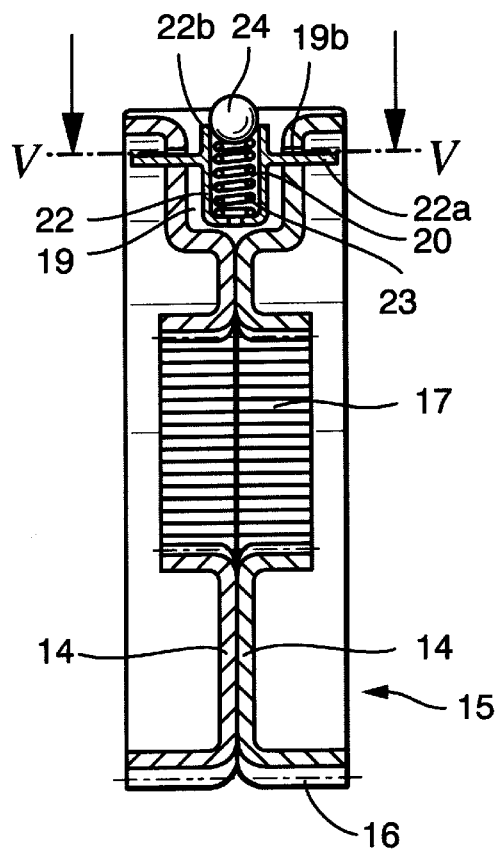
FIG. 4 is a sectional view of the synchronizer element, taken along the line IV—IV in FIG. 3.

The synchronizer element 15, shown in FIG. 3, is configured as assembly unit which includes a central hub 15a, which is internally splined (internal teeth 17), and a guide member 15b which is connected to the hub 15a and externally splined (outer teeth 16) for meshed engagement with complementary teeth of the shift sleeve 6. Spaced evenly about the outer periphery of the guide member 15b are three structural units 20 which are shown in more detail in FIG. 4. The synchronizing element 15 is composed of the two symmetric parts 14 which are joined together at their end faces to form the pockets 19. Received in each pocket 19 is a structural unit 20 which includes a pot-shaped housing 22 having formed thereon tabs 22a which project out from the housing 22 and extend through bores 19b formed in the wall of the synchronizer element 15 in the area of pocket 19 to allow axial movement of the structural unit 20. Accommodated in the housing 22 is a compression spring 23 which biases a spherical locking element 24 against an opening 22b of the housing 22, whereby the locking element 24 is held in place by the circumferential edge of the opening 22b.

Figure 5:
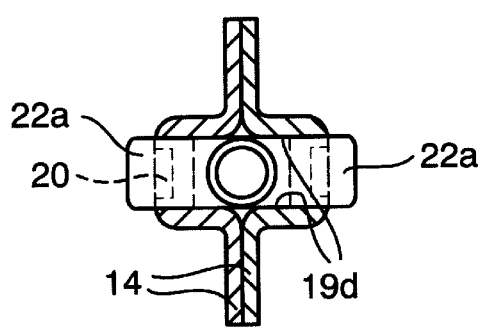
FIG. 5 is a sectional view of the synchronizer element, taken along the line V—V in FIG. 4 to show a structural unit.

As shown in FIG. 5, the pockets 19 are provided with lateral guide surfaces 19d to prevent a spinning of the structural unit 20 about its own center axis.

Figure 6:
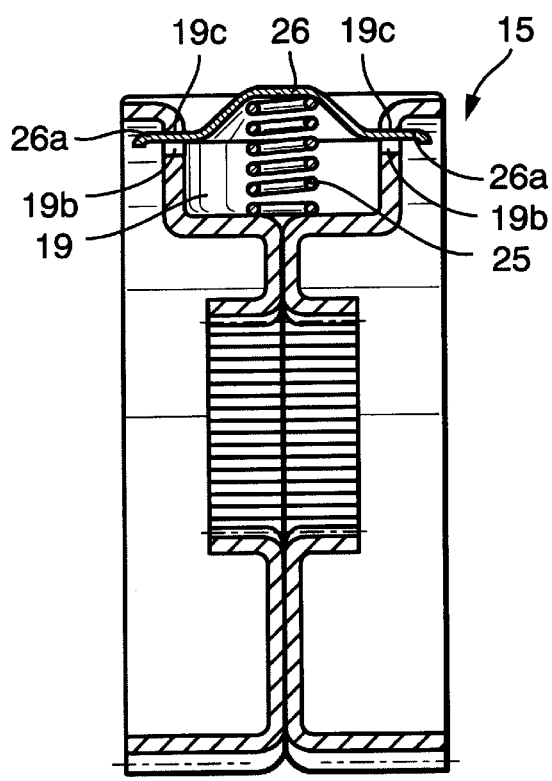
FIG. 6 is a sectional view of a synchronizer element according to the present invention having installed therein an assembly unit with resilient thrust member.

Turning now to FIG. 6, there is shown a synchronizing element 15 which has pockets 19 for housing a modified structural unit in the form of a compression spring 25 which extends between the bottom of the pocket 19 and a thrust member 26 made through non-cutting process and loaded by the compression spring 23 against the upper edges 19c of the pocket 19. The opposite ends 26a of the thrust member 26 are guided in bores 19b for movement in axial direction.

While the invention has been illustrated and described as embodied in a synchronizing device for a manual transmission, in particular synchronizer element with integrated thrust member or locking member for use in a such a synchronizing device, it is not intended to be limited to the details shown since various modifications and structural changes may be made without departing in any way from the spirit of the present invention.

What is claimed as new and desired to be protected by Letters Patent is set forth in the appended claims:

1. A synchronizing device for manual transmissions, comprising:
   a synchronizer element including a hub secured in fixed rotative engagement on a gearshaft and defining a longitudinal axis, and a guide member connected in fixed rotative engagement with the hub and having a splined outer circumference formed with a pocket;
   an internally splined shift sleeve so meshing with the splined outer circumference of the guide member as to establish a fixed rotative engagement therebetween and to permit a movement of the shift sleeve along the longitudinal axis for cooperation with axially spaced pinion gears; and
   a load-applying means, received in the pocket of the guide member, for cooperating with at least one of said shift sleeve and a synchronizer ring, said load-applying means being a spring-loaded locking member which is held captive and guided in the pocket,
   said synchronizer element being made of two separate parts which are made separately through a non-cutting forming process and joined together at a partition plane of the synchronizer element, thereby forming the pocket for the loading means.

2. A synchronizing device for manual transmissions, comprising:
   a synchronizer element secured in fixed rotative engagement on a gearshaft and defining a longitudinal axis, said synchronizing element having a circumference formed with a plurality of spaced-apart pockets for captivating and guiding a same number of thrust members, whereby the pockets and the thrust members are placed into one-to-one correspondence;
   a shift sleeve connected to the synchronizer element in a fixed rotative engagement therebetween while permitted to move in direction of the longitudinal axis for selective connection with axially spaced pinion gears; and
   braking means positioned between the shift sleeve and the pinion gears and acted upon by the thrust member to effect a speed deceleration of the pinion gears to a speed matching a speed of the gearshaft before the shift sleeve engages the selected of the pinion gears,
   said synchronizer element being made of two separate parts which are made separately through a non-cutting forming process and joined together at a partition plane of the synchronizer element, thereby forming the pockets for the thrust member.

3. The synchronizing device of claim 2 wherein the thrust member has ends pointing in opposite directions and guided in adjacent bores of the pocket for free movement along the longitudinal axis, said ends of the thrust member jutting out beyond an outer contour of the pocket.

4. A synchronizing device for manual transmissions, comprising:
   a synchronizer element including a hub secured in fixed rotative engagement on a gearshaft and defining a longitudinal axis, and a guide member connected in fixed rotative engagement with the hub and having a splined outer circumference formed with a pocket;
   an internally splined shift sleeve so meshing with the splined outer circumference of the guide member as to establish a fixed rotative engagement therebetween and to permit a movement of the shift sleeve along the longitudinal axis for cooperation with axially spaced pinion gears; and
   a load-applying means, received in the pocket of the guide member, for cooperating with at least one of said shift sleeve and a synchronizer ring, said load-applying means being a spring-loaded thrust member which is held captive in the pocket and has ends pointing in opposite directions and guided in adjacent bores of the pocket for free movement along the longitudinal axis, said ends of the thrust member jutting out beyond an outer contour of the pocket, said synchronizer element being made of two separate parts which are made separately through a non-cutting forming process and joined together at a partition plane of the synchronizer element, thereby forming the pocket for the loading means.

5. A synchronizing device for manual transmissions, comprising:

a synchronizer element including a hub secured in fixed rotative engagement on a gearshaft and defining a longitudinal axis, and a guide member connected in fixed rotative engagement with the hub and having a splined outer circumference formed with a pocket;

an internally splined shift sleeve so meshing with the splined outer circumference of the guide member as to establish a fixed rotative engagement therebetween and to permit a movement of the shift sleeve along the longitudinal axis for cooperation with axially spaced pinion gears; and a load-applying means, received in the pocket of the guide member, for cooperating with at least one of said shift sleeve and a synchronizer ring, said load-applying means being a structural unit which is held captive and guided in the pocket and is comprised of a housing and a combination of spring-loaded locking member and spring-loaded thrust member received in the housing, said synchronizer element being made of two separate parts which are made separately through a non-cutting forming process and joined together at a partition plane of the synchronizer element, thereby forming the pocket for the loading means.

6. The synchronizing device of claim 5 wherein the housing of the structural unit has tabs pointing in opposite direction and guided in adjacent bores of the pocket for free movement along the longitudinal axis, said tabs of the thrust member jutting out beyond an outer contour of the pocket.

* * * * *